United States Patent
Chang et al.

(10) Patent No.: US 10,088,811 B2
(45) Date of Patent: Oct. 2, 2018

(54) VARIABLE PID GAIN DESIGN DEVICE AND METHOD FOR CONTROLLING MULTI-VARIABLE NONLINEAR SYSTEM

(71) Applicant: Daegu Gyeongbuk Institute of Science and Technology, Daegu (KR)

(72) Inventors: Pyung Hun Chang, Daegu (KR); Jun Young Lee, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 377 days.

(21) Appl. No.: 14/905,824

(22) PCT Filed: Sep. 30, 2013

(86) PCT No.: PCT/KR2013/008745
§ 371 (c)(1),
(2) Date: Jan. 18, 2016

(87) PCT Pub. No.: WO2015/008896
PCT Pub. Date: Jan. 22, 2015

(65) Prior Publication Data
US 2016/0161925 A1    Jun. 9, 2016

(30) Foreign Application Priority Data
Jul. 19, 2013   (KR) .................. 10-2013-0085458

(51) Int. Cl.
*G05B 11/42*      (2006.01)

(52) U.S. Cl.
CPC ................... *G05B 11/42* (2013.01)

(58) Field of Classification Search
CPC ........................................ G05B 11/42
See application file for complete search history.

(56) References Cited

U.S. PATENT DOCUMENTS

| | | | |
|---|---|---|---|
| 6,264,111 B1 | 7/2001 | Nicolson et al. | |
| 2004/0153173 A1* | 8/2004 | Chang et al. .......... | G05B 11/42 700/37 |
| 2010/0309044 A1 | 12/2010 | Ische et al. | |

FOREIGN PATENT DOCUMENTS

| | | |
|---|---|---|
| JP | 07-056604 A | 3/1995 |
| JP | 2001-100803 A | 4/2001 |
| JP | 2004-355113 A | 12/2004 |

(Continued)

OTHER PUBLICATIONS

International Search Report for PCT/KR2013/008745 dated Apr. 9, 2014 from Korean Intellectual Property Office.

*Primary Examiner* — Tejal Gami
(74) *Attorney, Agent, or Firm* — Revolution IP, PLLC

(57) ABSTRACT

A variable PID gain design device, including: a parameter setting unit for setting a natural frequency, a damping ratio, a sampling time, and a nonlinear damping, which enable establishment of an error dynamics required for controlling an object to be controlled; a PID gain induction unit for inducing a PID gain, using the correlation between a PID control and a backstepping control with time delay estimation and nonlinear damping (BCTND), the PID control controlling, using the set parameters, the object to be controlled; and a PID gain calculating unit for calculating a gain of a PID controller by adjusting a BCTND control gain on the basis of the induced PID gain.

4 Claims, 2 Drawing Sheets

(56) References Cited

FOREIGN PATENT DOCUMENTS

| KR | 1992-0018544 A | 10/1992 |
|----|----------------|---------|
| KR | 10-2000-0051941 A | 8/2000 |
| KR | 10-0507835 B1 | 8/2005 |
| KR | 10-2012-0030526 A | 3/2012 |

* cited by examiner

【FIG. 1】
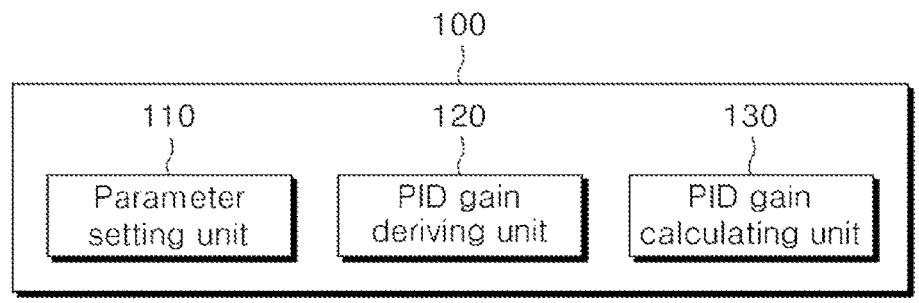
【FIG. 2】
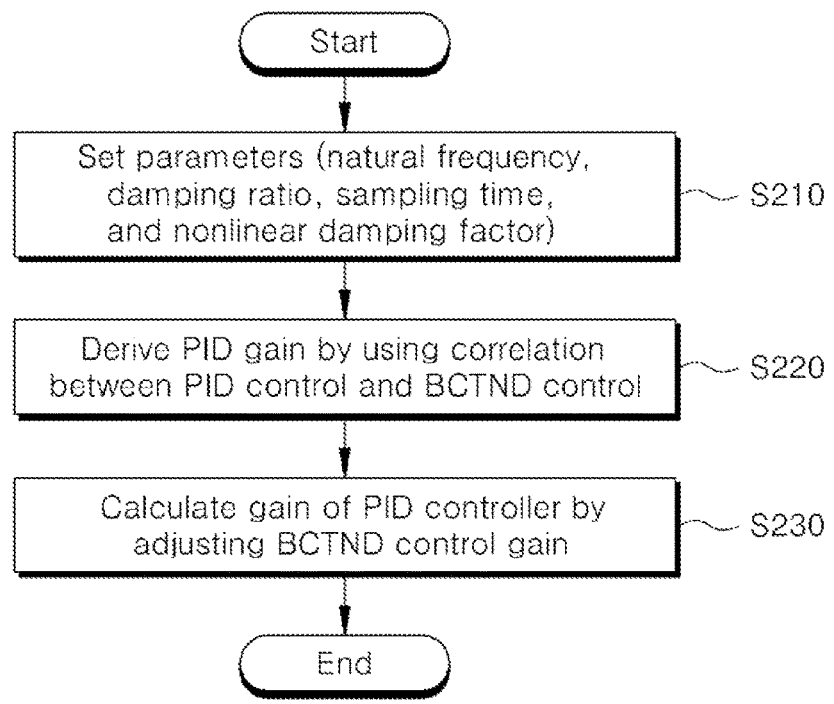

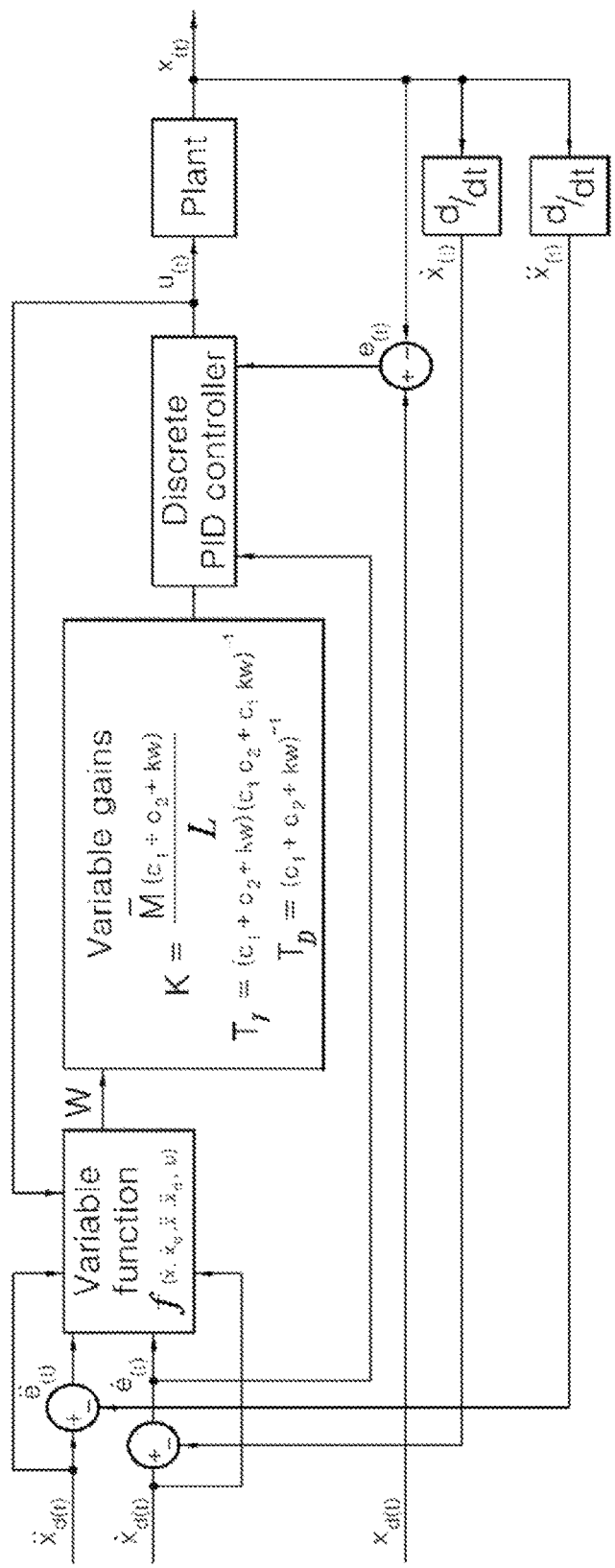
[FIG. 3]

VARIABLE PID GAIN DESIGN DEVICE AND METHOD FOR CONTROLLING MULTI-VARIABLE NONLINEAR SYSTEM

CROSS REFERENCE TO PRIOR APPLICATIONS

This application is a National Stage Application of PCT International Patent Application No. PCT/KR2013/008745 filed on September 30, 2013, under 35 U.S.C. § 371, which claims priority to Korean Patent Application No. 10-2013-0085458 filed on Jul. 19, 2013, which are all hereby incorporated by reference in their entirety.

TECHNICAL FIELD

The present invention relates to a device and a method for designing gains of a PID controller, and more particularly, to a device and a method for designing variable gains of a PID controller on the basis of backstepping control with time delay estimation and nonlinear damping (BCTND)

BACKGROUND ART

A proportional integral derivative (PID) controller is one of controllers that are widely used in industrial fields of a control systems sector. The PID controller has a simple structure that includes proportional, integral, and derivative parts. The gains of the PID controller have a definite physical meaning, but there are numerous gains of the PID controller to be adjusted by an engineer, and it is difficult to make sure whether or not the a final gain correspond to an optimal gain. Particularly, designing PID gains required for controlling a multi-variable nonlinear system such as a robot requires a tremendous amount of time and efforts.

Many researches and techniques related to a design of gains of the PID controller for obtaining performance satisfying expectations have been presented. For example, a Ziegler-Nichols method is well-known in this field. This method is simple and can easily adjust PID gains, but does not provide satisfied performance in a nonlinear system. Generally, many researches show that the PID controller shows a proper level of performance in a linear system, but performance in a nonlinear system is difficult to estimate or frequently insufficient. Moreover, selecting a PID controller for a multi-variable nonlinear system is a very difficult task.

Particularly, in the case of conventional PID control techniques, when abrupt change occurs in the system dynamics, control performance may decrease or a stability problem may occur. Such a PID controller generally has a constant gain.

The background art of the present invention is disclosed in Korean Patent Laid-Open Publication No. 1992-0018544 (disclosed on Oct. 22, 1992).

DISCLOSURE

Technical Problem

The present invention has been made in an effort to disclose a technique about a variable PID controller gain design method. In the present invention, in order to determine variable PID gains, a correlation between BCTND and a variable PID controller is established, and the variable gains of the PID controller are determined using the correlation.

Technical Solution

A variable PID gain design device according to an exemplary embodiment of the present invention, wherein a PID controller controls a multi-variable nonlinear object to be controlled in a discrete time domain, comprising: a parameter setting unit for setting a natural frequency, a damping ratio, a sampling time, and a nonlinear damping factor (hereinafter referred to as "parameters"), which enable establishment of an error dynamics required for controlling an object to be controlled; a PID gain induction unit for inducing PID gains, using the correlation between a PID control and a backstepping control with time delay estimation and nonlinear damping (BCTND), the PID control controlling, using the set parameters, the object to be controlled; and a PID gain calculating unit for calculating a gain of a PID controller by adjusting a BCTND control gain on the basis of the induced PID gain.

The parameter setting unit may set a nonlinear damping factor W as a variable parameter that is determined by a feedback of the object to be controlled and an expected output.

The PID gain induction unit may induce, via numerical differentiation of the PID control and the BCTND control, the PID gain using the correlation between the two controls in discrete time domain.

The PID gain induction unit may induce variable gains of the PID controller associated with the parameters of the PID controller, such as a control loop gain, an integral time, and a derivative time, by using the natural frequency, the damping ratio, the sampling time, the nonlinear damping factor, and gains of the BCTND.

The PID gain calculating unit may calculate the PID gains by adjusting diagonal elements of a matrix corresponding to the BCTND control gain in an order from a small value to a large value.

A variable PID gain design method according to an exemplary embodiment of the present invention, wherein a PID control method controls a multi-variable nonlinear object to be controlled in a discrete time domain, comprising: setting a natural frequency, a damping ratio, a sampling time of a object to be controlled, and a nonlinear damping factor (hereinafter referred to as "parameters"), which enable establishment of an error dynamics required for controlling an object to be controlled; inducing PID gains, using the correlation between a PID control and a backstepping control with time delay estimation and nonlinear damping (BCTND), the PID control controlling, using the set parameters, the object to be controlled; and calculating a gain of a PID controller by adjusting a BCTND control gain on the basis of the induced PID gain.

Advantageous Effects

According to the present invention, when abrupt change occurs in the system dynamics, the controller can exhibit robust control characteristics due to the variable PID gains by the system feedback.

In addition, due to the variable gains, control performance of the multi-variable nonlinear system can be improved in the discrete time domain.

DESCRIPTION OF DRAWINGS

FIG. 1 is a schematic diagram of a variable PID gain design device according to an exemplary embodiment of the present invention.

FIG. 2 is a flowchart illustrating a variable PID gain design method according to an exemplary embodiment of the present invention.

FIG. 3 is a block diagram illustrating a PID control method using a variable PID gain design device or method according to an exemplary embodiment of the present invention.

BEST MODE

Hereinafter, exemplary embodiments of the present invention will be described in detail with reference to the accompanying drawings so that one of ordinary skill in the art may easily realize the present invention. As those skilled in the art would realize, the described embodiments may be modified in various different ways, all without departing from the spirit or scope of the present invention. Accordingly, the drawings and description are to be regarded as illustrative in nature and not restrictive, and like reference numerals designate like elements throughout the specification.

First, a variable PID gain design device of the present invention will be described.

FIG. 1 is a schematic diagram of a variable PID gain design device according to an exemplary embodiment of the present invention.

As shown in FIG. 1, the variable PID gain design device 100 according to the current exemplary embodiment of the present invention includes a parameter setting unit 110, a PID gain induction unit 120, and a PID gain calculating unit 130.

Here, a control system including the PID variable gain design device is devised as one exemplary embodiment. The control system is based on a nonlinear uncertain system with an n-degree-of-freedom (n-DOF), and is defined by the following Equation 1.

$$\ddot{x} = N(x,\dot{x}) + M(x)u \quad \text{(Equation 1)}$$

Here, x represents a state vector of the control system, and u is a control input vector. N is a vector type of nonlinear function that includes uncertainty and disturbance. M is an input matrix. The control system according to the current exemplary embodiment of the present invention may be designed as a strict-feedback type, and many physical systems such as a robot manipulator may be embodied as the system of the present invention.

The parameter setting unit 110 may set fixed parameters and variable parameters. The fixed parameters are set directly by a user, and the variable parameters are time varying parameters that are based on the fixed parameters and a system feedback.

The parameter setting unit 110 sets the fixed parameters by using a natural frequency, a damping ratio, and a sampling time that are received from the user. Parameters $c_1$ and $c_2$ of Equation 2 are parameters that are associated with the natural frequency and the damping ratio.

There are kinds of fixed parameters such as a natural frequency, a damping ratio, and a sampling time of an object to be controlled, which enable establishment of an error dynamics desired by the user.

The PID gain induction unit 120 induces PID gains by using a correlation between PID control using the set parameters and backstepping control with time delay estimation and nonlinear damping (BCTND). The PID gain induction unit induces an equation for calculating the PID variable gains. The equation for calculating the variable gain is an equation that includes the parameters as variables.

The PID gain calculating unit 130 calculates the gains of the PID controller by adjusting a BCTND control gain based on the induced PID gain. That is, the PID gain calculating unit 130 calculates the variable gains of the PID controller in a discrete time domain by adjusting the gain of the control input of the BCTND based on the equation for calculating the variable gains. Here, the PID gain calculating unit 130 determines the gains of the PID controller by adjusting diagonal elements of a matrix corresponding to the gain of the control input of the BCTND in an order from a small value to a large value.

The control system according to the current exemplary embodiment of the present invention further includes the PID controller that controls the system by receiving the PID variable gains from the PID gain calculating unit 130.

Next, a variable PID gain design device of the present invention will be described in more detail.

FIG. 2 is a flowchart illustrating a variable PID gain design method according to an exemplary embodiment of the present invention, and FIG. 3 is a block diagram illustrating a PID control method using a variable PID gain design device or method according to an exemplary embodiment of the present invention.

A parameter setting unit 110 sets a natural frequency and a damping ratio that enable establishment of an error dynamics required by an object to be controlled (Plant) (S210). That is, when the error dynamics desired by a user is devised, the parameter setting unit 110 sets the natural frequency and the damping ratio corresponding to the error dynamics. Here, the error dynamics may be established by defining parameters $c_1$ and $c_2$ as expressed by the following Equation 2. That is, the parameter setting unit 110 may directly set parameters $c_1$ and $c_2$, instead of setting the natural frequency and the damping ratio.

$$\ddot{e}(t) + (c_1 + c_2)\dot{e}(t) + c_1 c_2 e(t) = 0$$

$$e = x_d - x \quad \text{(Equation 2)}$$

Here, e represents an error vector and is defined as follows.

x represents a state vector of a control system, and $x_d$ represents a desired output (expected output).

The parameter setting unit 110 sets a sampling time as one of parameters (S210). Since the control system according to the current exemplary embodiment of the present invention corresponds to s discrete time domain, the sampling time needs to be set. The sampling time is represented by L. The sampling time is set in consideration of computing power of a hardware controller. The smaller the sampling time is, the better performance the controller shows.

FIG. 3 is a block diagram illustrating a PID control method using a variable PID gain design device or method according to an exemplary embodiment of the present invention.

The parameter setting unit 110 sets a nonlinear damping factor W such as a variable parameter. In FIG. 3, it can be seen that the nonlinear damping factor W is set as a variable parameter by a Variable function block. That is, the nonlinear damping factor W is a time-varying parameter that varies depending on two input elements $\dot{x}_d$ and $\ddot{x}_d$ and three feedback factors $\dot{x}$, $\ddot{x}$, and u.

The PID gain induction unit 120 induces PID gains by using a correlation between PID control for controlling an object to be controlled via use of the set parameters and BCTND (S220).

The present invention has an advantage of designing a robust PID controller based on the BCTND, and for this purpose, the correlation between the BCTND and the PID controller is used.

$$u(k) = -\overline{M}c_2 z_2(k-1) + u(k-1) - \overline{M}\dot{z}_1(k-1) - \overline{M}kwz_2(k-1) \quad \text{(Equation 3)}$$

The BCTND control input can be expressed by Equation 3. Here, $z_2 = \dot{z}_1 - c_1 z_1$ and $z_1 = x - x_d = -e$, $c_1$ and $c_2$ are diagonal matrices that are determined in a real number range, and w is a diagonal matrix that is determined by nonlinear dampening in the positive real number range.

In Equation 3, $\overline{M}$ is a diagonal gain matrix that is determined in the positive real number range. In addition, k is also a diagonal gain matrix that is determined in the positive real number range.

The BCTND control input of Equation 3 can be modified as in the following Equation 4.

$$u(k) = u(k-1) - \overline{M}[\ddot{x}_d(k-1) - \ddot{x}(k-1) + (c_1+c_2+kw)(\dot{x}_d(k-1)-\dot{x}(k-1)) + (c_1 c_2 + c_1 kw)(x_d(k-1)-x(k-1))] \quad \text{(Equation 4)}$$

The PID gain induction unit 120 induces a correlation between the PID control input for controlling the object to be controlled (Plant) via use of the parameters set in the parameter setting unit 110 and the BCTND control input (S220).

The PID control input for deriving the correlation in the discrete time domain can be expressed by the following Equation 5. The parameter setting unit 110 sets parameters of the PID control input by assigning a natural frequency, a damping ratio, and a sampling time of the object to be controlled.

$$u(k) = K\left[e(k-1) + LT_I^{-1} \sum_{i=0}^{k-1} e(i) + T_D \dot{e}(k-1)\right] + u_{DC} \quad \text{(Equation 5)}$$

$$e = x_d - x$$

Here, e represents an error vector, $x_d$ represents desired output, and k represents a discreet time at time $t_k$ and at the k-th sampling instant, respectively. In addition, K, $T_I$, and $T_D$ are parameters of the PID controller which respectively denote a control loop gain, an integral time, a derivative time. $u_{DC}$ is a dc-bias that is determined by an initial condition.

The PID gain induction unit 120 may convert a control input of the PID controller of Equation 4 to the following Equation 6 by using a discrete PID velocity algorithm.

$$u(k) = u(k-1) + KL\left[T_I^{-1}(x_d(k-1) - x(k-1)) + \left(\frac{\dot{x}_d(k-1) - \dot{x}_d(k-2)}{L} - \frac{\dot{x}(k-1) - \dot{x}(k-2)}{L}\right) + T_D\left(\frac{\dot{x}_d(k-1) - \dot{x}_d(k-2)}{L} - \frac{\dot{x}(k-1) - \dot{x}(k-2)}{L}\right)\right] \quad \text{(Equation 6)}$$

Here, L represents a sampling time.

In addition, using numerical differentiation, the PID gain induction unit 120 may convert the PID control input of Equation 5 to the following Equation 7 and the BCTND control input of Equation 4 to the following Equation 8, respectively.

$$u(k) = u(k-1) + KL\left[T_I^{-1}(x_d(k-1) - x(k-1)) + \left(\frac{x_d(k-1) - x_d(k-2)}{L} - \frac{x(k-1) - x(k-2)}{L}\right) + T_D\left(\frac{x_d(k-1) - 2x_d(k-2) + x_d(k-3)}{L^2} - \frac{x(k-1) - 2x(k-2) + x(k-3)}{L^2}\right)\right] \quad \text{(Equation 7)}$$

$$u(k) = u(k-1) + \overline{M}[(c_1 c_2 + c_1 kw)(x_d(k-1) - x(k-1)) + \left(\frac{x_d(k-1) - 2x_d(k-2) + x_d(k-3)}{L^2} - \frac{x(k-1) - 2x(k-2) + x(k-3)}{L^2}\right)] \quad \text{(Equation 8)}$$

The PID gain induction unit 120 induces variable gains of the PID controller by using the correlation, based on the set natural frequency, damping ratio, sampling time, and gain matrix (S220). That is, the PID gain induction unit 120 induces the correlation by comparing Equation 7 and Equation 8, and variable gains of the PID controller associated with the induced correlation are expressed by the following Equation 9.

$$K = \frac{\overline{M}(c_1 + c_2 + kw)}{L} \quad \text{(Equation 9)}$$

$$T_I = (c_1 + c_2 + kw)(c_1 c_2 + c_1 kw)^{-1}$$

$$T_D = (c_1 + c_2 + kw)^{-1}$$

Here, $c_1$ and $c_2$ are determined by a desired error dynamics, and $\overline{M}$ and k are determined by gain tuning. W is a nonlinear damping factor. As described above, the variable gains of the PID controller are determined by the parameter setting unit 110 and the PID gain induction unit 120.

FIG. 3 is a block diagram illustrating a PID control method using a variable PID gain design device or method according to an exemplary embodiment of the present invention.

FIG. 3 illustrates that the nonlinear damping factor W set in the parameter setting unit 110 is transmitted to the PID gain calculating unit 120 (Variable gains).

Mathematically, the nonlinear damping factor W consists of three components as shown in the following Equation 10.

$$w = \hat{F} + \beta + \rho \quad \text{(Equation 10)}$$

Here, the three components are expressed by the following Equation 11.

$$\hat{F} = \text{diag}(\dot{x}_1^2(t) + \dot{x}_2^2(t) + \ldots + \dot{x}_n^2(t) + \varepsilon,$$

$$\dot{x}_1^2(t) + \dot{x}_2^2(t) + \ldots + \dot{x}_n^2(t) + \varepsilon,$$

$$\ldots, \dot{x}_1^2(t) + \dot{x}_2^2(t) + \ldots + \dot{x}_n^2(t) + \varepsilon)$$

$$\beta = \text{diag}(|\ddot{x}_{d1\_n}(t) - c_{1\_11}\dot{e}_1(t)|, |\ddot{x}_{d\_2}(t) - c_{1\_22}\dot{e}_2(t)|,$$

$$\ldots, |\ddot{x}_{d\_n}(t) - c_{1\_nn}\dot{e}_n(t)|)$$

$$\rho = \text{diag}(|u_1(t-L) + \overline{M}_{11}(\ddot{e}_1(t-L) + c_{1\_11}\dot{e}_1(t-L))|,$$

$$|u_2(t-L) + \overline{M}_{22}(\ddot{e}_2(t-L) + c_{1\_22}\dot{e}_2(t-L))|,$$

$$\ldots, |u_n(t-L) + \overline{M}_{nn}(\ddot{e}_n(t-L) + c_{1\_nn}\dot{e}_n(t-L))|), \quad \text{(Equation 11)}$$

Here, ε represents a positive real number used for maintaining a positive definite of $\hat{F}$, $\bullet_i$ (single subscript notation)

represents a vector, an $*_n$ (double subscript notation) represents a diagonal matrix (i=1, . . . , n), respectively.

In addition, the nonlinear damping factor W may be defined by the following Equation 12.

$$w = \text{diag}(w_{11}, w_{22}, \ldots, w_{nn}) \quad \text{(Equation 12)}$$

From Equation 11 and Equation 12, it can be seen that $c_1$ and ε are constants that are set by the parameter setting unit 110 according to a design. Accordingly, in the discrete time domain, the nonlinear damping factor W is expressed by the following Equation 13.

$$w(k) = f(\dot{x}(k-1), \dot{x}_d(k-1), \ddot{x}(k-1), \ddot{x}_d(k-1), u(k-1)) \quad \text{(Equation 13)}$$

The PID gain calculating unit 130 calculates the gain of the PID controller by adjusting the BCTND control gain based on the induced PID gain (S230). That is, the PID gain calculating unit 130 calculates the variable gains of the PID controller by adjusting $\overline{M}$ and k corresponding to the BCTND control gain and using Equation 9, and sets $\overline{M}$ and k by gradually increasing values of the diagonal elements from a small value to a large value until noise is generated in the system. The element of k needs to be set after setting the element of $\overline{M}$.

When the variable gains of the PID controller are determined by the process described above, the discrete PID controller of FIG. 3 controls the object to be controlled (Plant) by using the variable gains.

As described above, in accordance with the variable PID gain design device and method according to the current exemplary embodiment of the present invention, even when an abrupt change occurs in the system dynamics, the controller can exhibit robust control characteristics due to the PID variable gains by the system feedback.

In addition, the control performance of the multi-variable nonlinear system can be improved due to the PID variable gains in the discrete time domain.

The present invention has been described based on the exemplary embodiments. Although the exemplary embodiments have been described, those skilled in the art will readily appreciate that many modifications are possible, without departing from the spirit and scope of the present invention. Therefore, it is to be construed that the exemplary embodiments disclosed herein are to be considered as descriptive aspects rather than restrictive aspects. Accordingly, it is to be understood that the invention is not limited to the disclosed embodiments, but, on the contrary, is intended to cover various modifications and equivalent arrangements included within the spirit and scope of the appended claims.

The invention claimed is:

1. A variable PID (Positional Integral Derivative Controller) gain design device comprising:
at least one of units being configured and executed by a PID controller using algorithm associated with least one non-transitory storage device for controlling a multi-variable nonlinear system, the at least one of units comprising;
parameter setting unit for setting a natural frequency, a damping ratio, a sampling time, and a nonlinear damping factor which enable establishment of an error dynamics required for controlling an object to be controlled;
a PID gain induction unit for inducing a PID gain, using the correlation between a PID control and a backstepping control with time delay estimation and nonlinear damping (BCTND), the PID control controlling, using the set parameters, the object to be controlled, wherein the PID gain induction unit induces, via numerical differentiation an input of the PID control and an input of the BCTND control, the PID gain using the correlation between inputs of the PID control and the BCTND control; and
a PID gain calculating unit for calculating a gain of the PID controller by adjusting a BCTND control gain on the basis of the induced PID gain, wherein
the PID gain calculating unit calculates the PID gains by adjusting diagonal elements of a matrix corresponding to the BCTND control gain in an order from a small value to a large value, and wherein the PID controller controls a multi-variable nonlinear object to be controlled in a discrete time domain, wherein
variable gains of the PID controller associated with the induced correlation of the PID gain induction unit are expressed by the following equation:

$$K = \frac{\overline{M}(c_1 + c_2 + kw)}{L}$$
$$T_I = (c_1 + c_2 + kw)(c_1 c_2 + c_1 kw)^{-1}$$
$$T_D = (c_1 + c_2 + kw)^{-1},$$

and wherein
the c1 and c2 are determined by a desired error dynamics, and $\overline{M}$ and k are determined by gain tuning, and W is a nonlinear damping factor.

2. The apparatus of claim 1, wherein the parameter setting unit sets a nonlinear damping factor W such as a variable parameter that is determined by a feedback of an output of the object to be controlled and an expected output.

3. A computer-implemented variable PID gain design method including at least one of units being configured and executed by a PID controller using algorithm associated with least one non-transitory storage device for controlling multi-variable nonlinear system, the method comprising:
setting a natural frequency, a damping ratio, a sampling time of a object to be controlled, and a nonlinear damping factor which enable establishment of an error dynamics required for controlling an object to be controlled;
inducing a PID gain, using the correlation between a PID control and a backstepping control with time delay estimation and nonlinear damping (BCTND), the PID control controlling, using the set parameters, the object to be controlled, inducing the PID gain being performed by inducing, via numerical differentiation an input of the PID control and an input of the BCTND control, the PID gain using the correlation between inputs of the PID control and the BCTND control; and
calculating gains of the PID controller by adjusting a BCTND control gain on the basis of the induced PID gain, wherein
the PID gain calculating unit calculates the PID gains by adjusting diagonal elements of a matrix corresponding to the BCTND control gain in an order from a small value to a large value, and wherein the PID controller controls a multi-variable nonlinear object to be controlled in a discrete time domain, wherein
variable gains of the PID controller associated with the induced correlation of the PID gain induction unit are expressed by the following equation:

$$K = \frac{\overline{M}(c_1 + c_2 + kw)}{L}$$

$$T_I = (c_1 + c_2 + kw)(c_1 c_2 + c_1 kw)^{-1}$$

$$T_D = (c_1 + c_2 + kw)^{-1},$$

and wherein
the c1 and c2 are determined by a desired error dynamics, and $\overline{M}$ and k are determined by gain tuning, and W is a nonlinear damping factor.

4. The method of claim 3, wherein in the setting of the parameters, a nonlinear damping factor is set as a variable parameter that is determined by a feedback of an output of the object to be controlled and an expected output.

* * * * *